(12) United States Patent
Long

(10) Patent No.: US 8,839,689 B2
(45) Date of Patent: Sep. 23, 2014

(54) ROBOT ARM ASSEMBLY

(75) Inventor: Bo Long, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 735 days.

(21) Appl. No.: 12/975,665

(22) Filed: Dec. 22, 2010

(65) Prior Publication Data

US 2011/0259137 A1  Oct. 27, 2011

(30) Foreign Application Priority Data

Apr. 27, 2010  (CN) .......................... 2010 1 0157137

(51) Int. Cl.
*B25J 17/02*  (2006.01)

(52) U.S. Cl.
CPC ............ *B25J 17/0258* (2013.01); *Y10S 901/29* (2013.01)
USPC ......................... 74/490.05; 74/490.06; 901/29

(58) Field of Classification Search
USPC .................. 74/490.05, 490.06; 901/28, 29
See application file for complete search history.

(56) References Cited

U.S. PATENT DOCUMENTS

| 5,127,282 | A | | 7/1992 | Torii et al. | |
| 5,279,177 | A | * | 1/1994 | Inada | 74/490.06 |
| 5,456,132 | A | * | 10/1995 | Iwanaga et al. | 74/490.06 |
| 5,934,148 | A | * | 8/1999 | Haniya et al. | 74/490.06 |
| 2009/0095104 | A1 | * | 4/2009 | Larsson | 74/409 |

FOREIGN PATENT DOCUMENTS

| EP | 0084249 A2 | 7/1983 |
| GB | 2116142 A | 9/1983 |

* cited by examiner

*Primary Examiner* — William C Joyce
(74) *Attorney, Agent, or Firm* — Novak Druce Connolly Bove + Quigg LLP

(57) ABSTRACT

A robot arm assembly includes a first robot arm and a second robot arm; the second robot arm is rotatably connected to the first robot arm. The first robot arm includes a first sleeve, a first input shaft, and a second input shaft. The first input shaft and the second input shaft are seated in the first sleeve. The second robot arm includes a second sleeve and an output shaft; the output shaft is received in the second sleeve. The first input shaft is connected to the second sleeve via a pair of bevel gears, and drives the second sleeve to swing relative to the first sleeve. The second input shaft is connected to the output shaft via a plurality of bevel gears meshing with each other, and drives the output shaft to rotate relative to the second sleeve.

13 Claims, 5 Drawing Sheets

ROBOT ARM ASSEMBLY

BACKGROUND

1. Technical Field

The present disclosure relates generally to robotics and, more particularly, to a robot arm assembly.

2. Description of Related Art

A commonly used industrial robot includes a fixed base, a frame pivotally connected thereto about a first rotation axis, a lower arm, in which one end of the lower arm is pivotally connected to the frame about a second rotation axis, and an upper arm, in which one end of the upper arm is pivotally connected to the other end of the lower arm about a third rotation axis. An end-effector, such as a welding device, a gripper or a cutting tool, is mounted at a distal end of the upper arm of the industrial robot to execute specific tasks. Generally, six axes are utilized to achieve maximum movement of the end-effector.

In robots of this kind, each arm rotates around a rotation axis driven by a driving unit. Typically, the driving unit includes a motor mounted on the lower arm and a speed reducer coupled to the motor to transmit the movement of the motor to the upper arm. However, the speed reducer generally has a relatively large volume and is positioned in the lower arm or the upper arm, thus the lower arm and the upper arm is relatively large. In addition, a weight of the upper arm is mainly applied on an output shaft of the speed reducer, thereby reducing the mechanism strength thereof.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
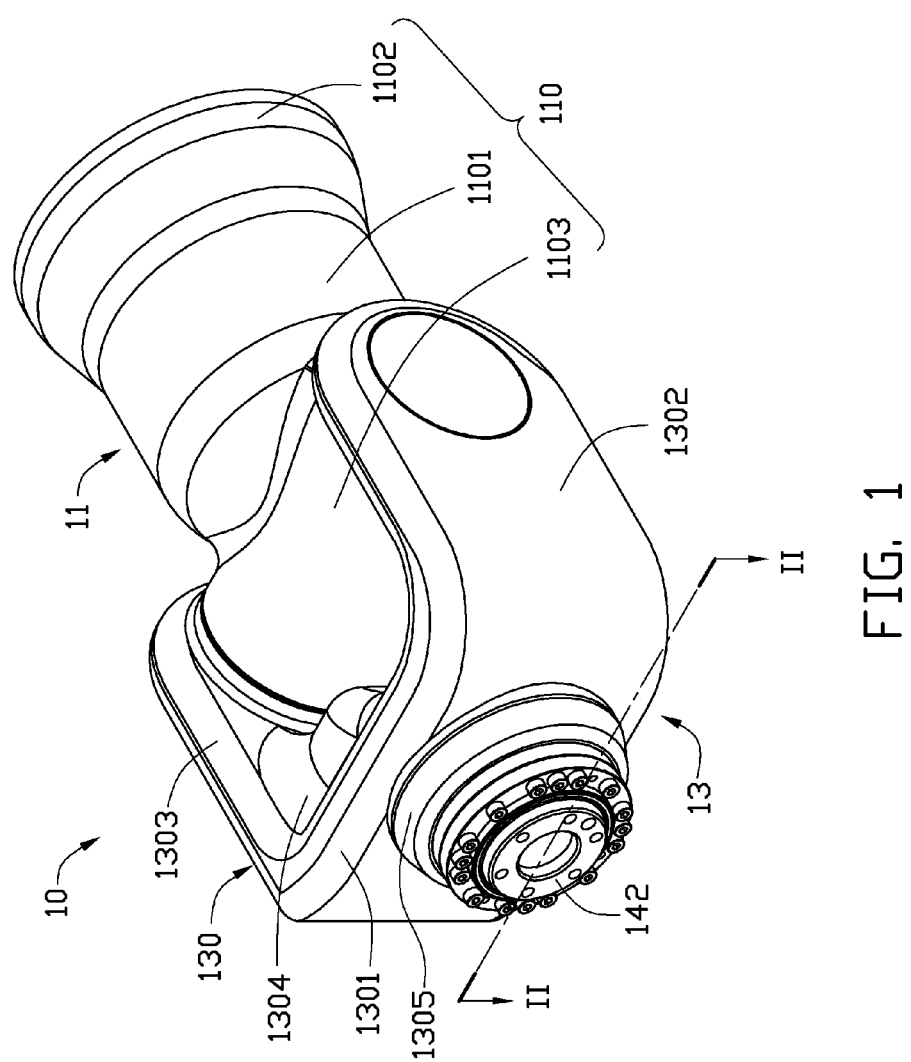
FIG. 1 is an assembled, isometric view of an embodiment of a robot arm assembly.

Referring to FIG. 1, an embodiment of a robot arm assembly 10 includes a first robot arm 11 and a second robot arm 13 rotatably connected thereto.

Referring to FIGS. 1 through 4, the first robot arm 11 includes a first sleeve 110, a first input shaft 112, a second input shaft 113, a first bevel gears 114, and a second bevel gears 115, a third bevel gear 116, a fourth bevel gear 119, a connecting base 117 and a connecting shaft 118.

The first sleeve 110 includes a base portion 1101, an assembly portion 1102, and a connecting portion 1103. The assembly portion 1102 and the connecting portion 1103 extend from opposite ends of the base portion 1101. The base portion 1101 axially defines a pivot hole 1105. The assembly portion 1102 axially defines an assembly hole 1107 communicating with the pivot hole 1105. A mounting surface 1106 is formed at a connecting portion of the assembly hole 1107 and the pivot hole 1105. The connecting portion 1103 axially defines a connecting hole 1108 communicating with the pivot hole 1105. In the illustrated embodiment, the base portion 1101, the assembly portion 1102, and the connecting portion 1103 are all substantially cylindrical.

The first input shaft 112 is hollow, and is rotatably seated in the pivot hole 1105 of the base portion 1101 via a first bearing 111a. The first bevel gear 114 is connected to an end of the first input shaft 112. The robot arm assembly 10 further includes a mounting member 111. The mounting member 111 is detachably mounted on the mounting surface 1106 by a plurality of fixing members 111e, and wholly received in the pivot hole 1105 and the assembly hole 1107. The second input shaft 113 is rotatably seated in the first input shaft 112 via a second bearing 111b. The second bevel gear 115 is connected to an end of the second input shaft 113. The third bevel gear 116 is rotatably seated in the assembly hole 1107 of the connecting portion 1103 via a third bearing 111c. The third bevel gear 116 meshes with the first bevel gear 114. The connecting base 117 is fixed in the assembly hole 1107 of the assembly portion 1102. The connecting shaft 118 is rotatably seated on the connecting base 117 via a fourth bearing 111d. The third bevel gear 116 is connected to an end of the connecting shaft 118. The connecting shaft 118 forms a flange 1181 at a middle part thereof. The fourth bevel gear 119 is sleeved on the connecting shaft 118, and is between the flange 1181 and the connecting base 117. The fourth bevel gear 119 meshes with the second bevel gear 115.

The second robot arm 13 includes a second sleeve 130, an output shaft 131, a fifth bevel gear 132, a sixth bevel gear 133, a seventh bevel gear 134, a positioning base 135, an eighth bevel gear 136, a ninth bevel gear 137, a tenth bevel gear 138, a positioning base 140, a positioning shaft 141, and an output flange 142.

Referring to FIG. 1 again, the second sleeve 130 is substantially U-shaped, and includes a main body 1301, a first connecting arm 1302 and a second connecting arm 1303 extending from opposite sides of the main body 1301. The second sleeve 130 further forms a receiving portion 1304 adjacent to the second connecting arm 1303. The main body 1301 forms an output portion 1305 at a middle part.

The first connecting arm 1302 connects a side of the first robot arm 11 assembled with the third bevel gear 116. The first connecting arm 1302 has a fixing base 143 connected to the third bevel gear 116.

The second connecting arm 1303 connects a side of the first robot arm 11 assembled with the connecting base 117. The fifth bevel gear 132 is positioned in the second connecting arm 1303, and fixed to the connecting shaft 118.

The sixth bevel gear 133, the seventh bevel gear 134, and the positioning base 135 are received in the receiving portion 1304. The seventh bevel gear 134 is rotatably seated in the positioning base 135 via a fifth bearing 139a. The sixth bevel gear 133 is fixed to an end of the seventh bevel gear 134, and meshes with the fifth bevel gear 132.

The positioning shaft 141 is rotatably seated on the positioning base 140 via a sixth bearing 139b. The eighth bevel gear 136 and the ninth bevel gear 137 are fixed on opposite ends of the positioning shaft 141. The eighth bevel gear 136 meshes with the seventh bevel gear 134. The tenth bevel gear 138 meshes with the ninth bevel gear 137.

The output shaft 131 is positioned in the output portion 1305, and connected to the tenth bevel gear 138. An end of the output shaft 131 connects the output flange 142.

In the illustrated embodiment, the third bearing 111c is a cross roller bearing, and the first bearing 111a, the second bearing 111b, the fourth bearing 111d, the fifth bearing 139a, and the sixth bearing 139b are a plurality of roller bearings.

Figure 2:
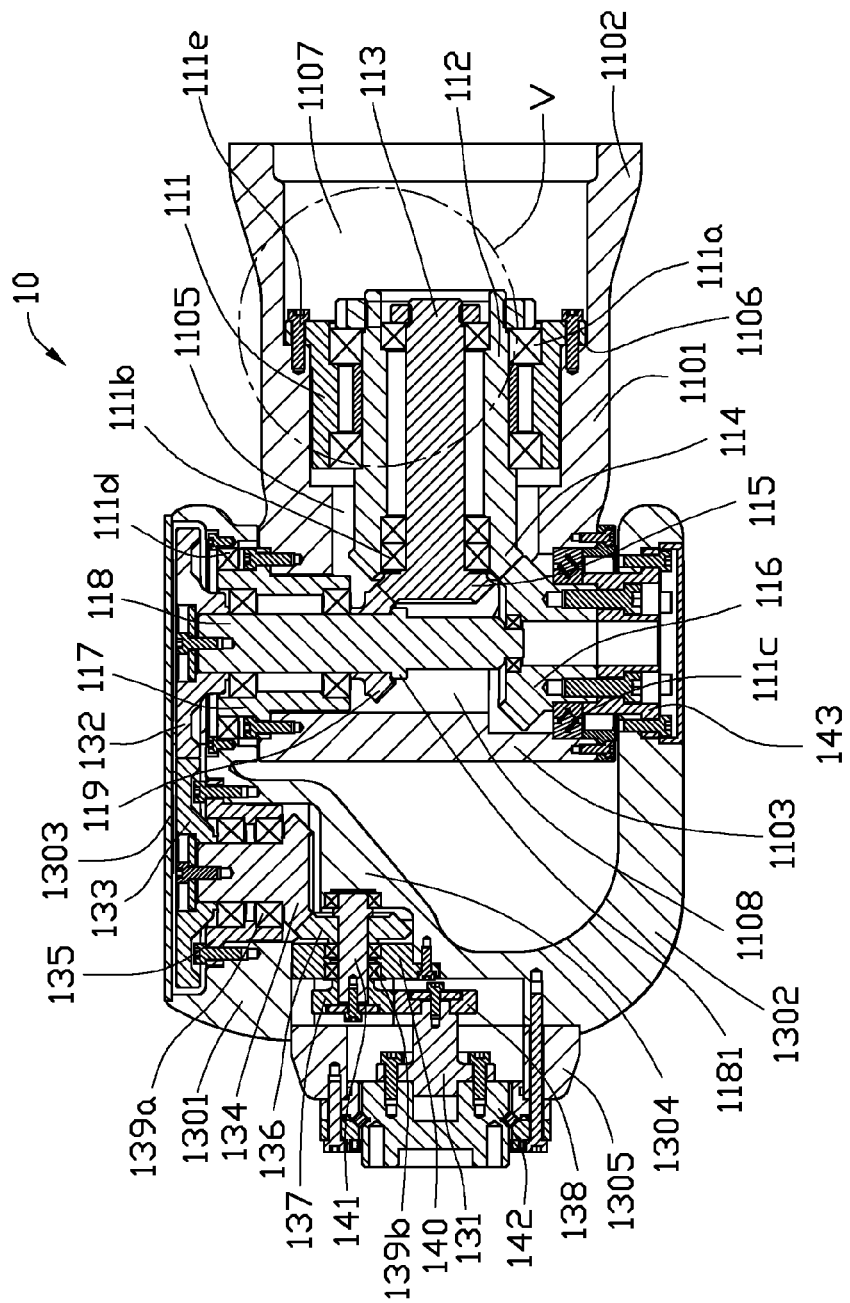
FIG. 2 is a cross-section of the robot arm assembly of FIG. 1, taken along the line II-II
Figure 3:
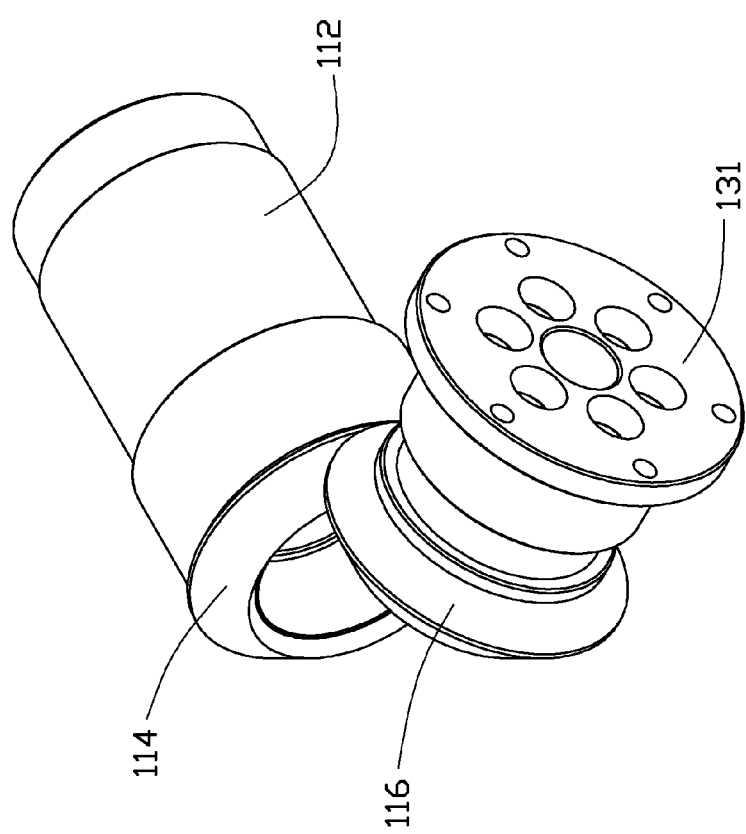
FIG. 3 is an isometric view of a first input shaft and a plurality of bevel gears of FIG. 2.

Referring to FIGS. 2 and 3, in use, the first input shaft 112 drives the second sleeve 130 to rotate relative to the first sleeve 110 via the first bevel gear 114 and the third bevel gear 116. As a result, the output shaft 131 swings relative to the first robot arm 11.

Figure 4:
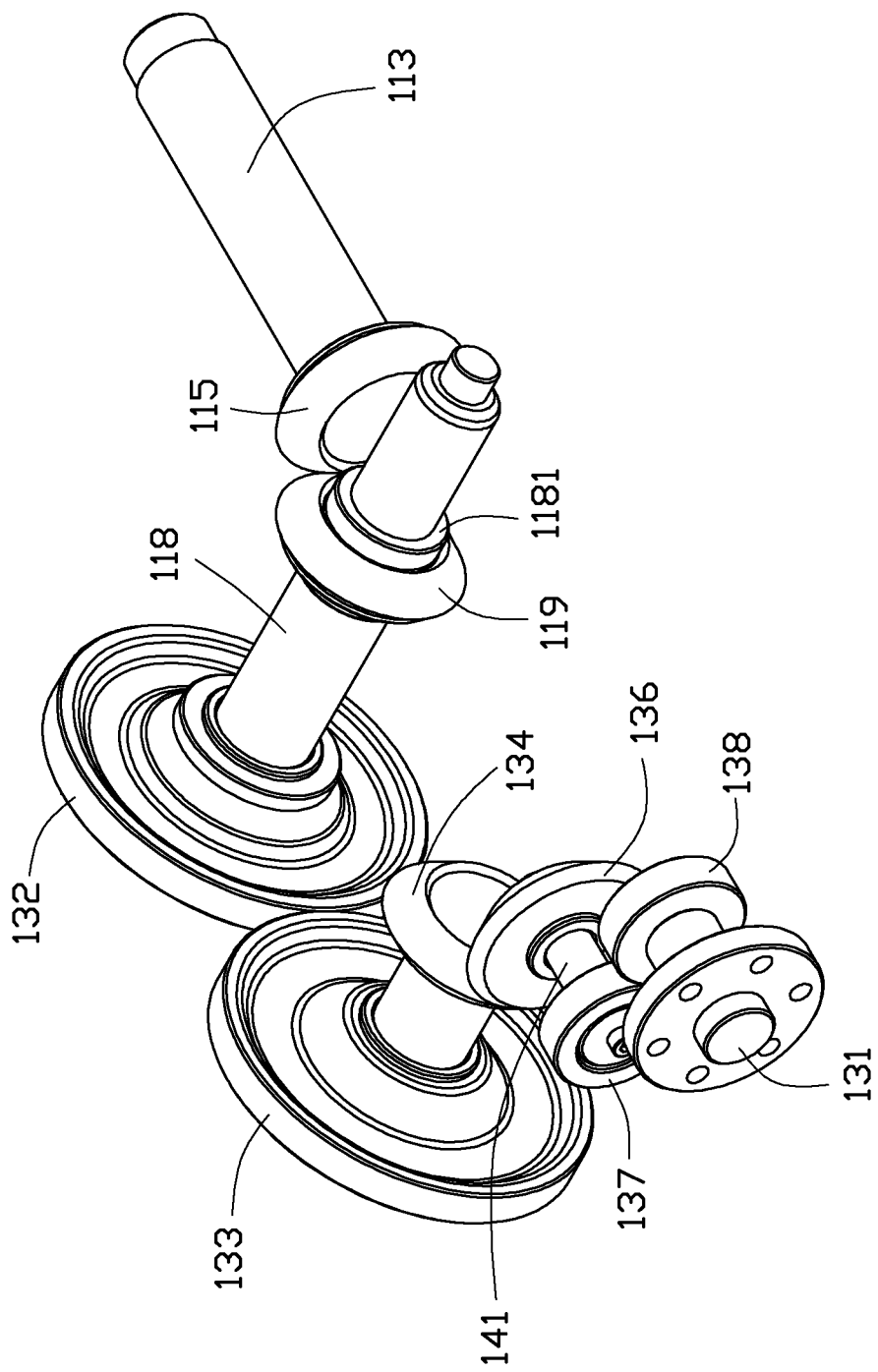
FIG. 4 is an isometric view of the bevel gears connecting a second input shaft to an output shaft of FIG. 2.
Figure 5:
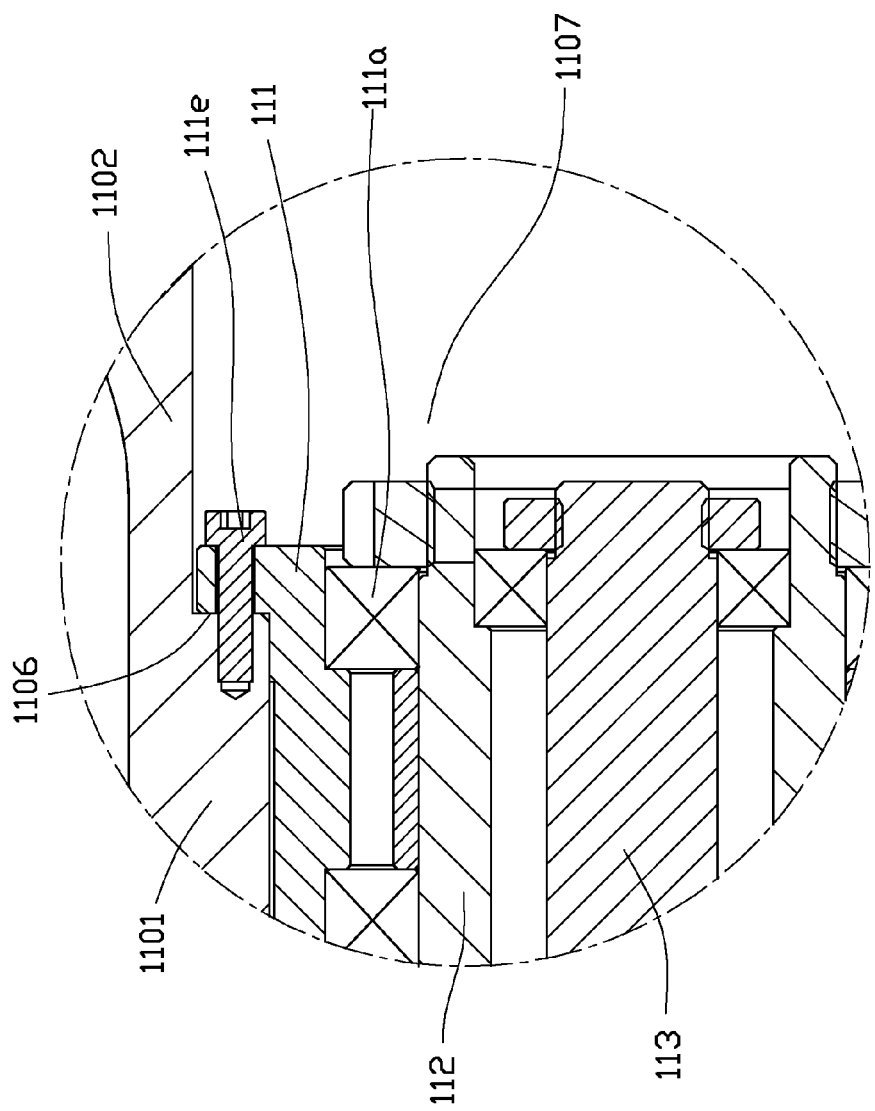
FIG. 5 is an enlarged view of a circled portion V of FIG. 2.

Referring to FIGS. 2 and 4, the second input shaft 113 drives the output shaft 131 to rotate relative to the second sleeve 130 via the second bevel gear 115, the fourth bevel gear 119, the connecting shaft 118, the fifth bevel gear 132, the sixth bevel gear 133, the seventh bevel gear 134, the eighth bevel gear 136, the positioning shaft 141, the ninth bevel gear 137, and the tenth bevel gear 138 in turns.

The input kinetic energy of the first input shaft 112 and the second input shaft 113 is transmitted to the second sleeve 130 and the output shaft 131 via a plurality of bevel gears 114, 115, 116, 119, 132, 133, 134, 136, 137, and 138, thus there is no need for having a larger speed reducer in the robot arm assembly 10. As a result, the robot arm assembly 10 is more compact. A weight of the second robot arm 13 is separately applied to the plurality of bevel gears 114, 115, 116, 119, 132, 133, 134, 136, 137, and 138, thereby the mechanism strength of the robot arm assembly 10 is enhanced. In addition, the first input shaft 112 is sleeved on the second input shaft 113, and the plurality of bevel gears 114, 115, 116, 119, 132, 133, 134, 136, 137, and 138 is positioned on opposite sides of the robot arm assembly 10, thus further conserving overall size of the robot arm assembly 10.

It should be appreciated that the number of bevel gears used in the robot arm assembly 10 can be decreased or increased according to a shape of the robot arm assembly 10.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A robot arm assembly, comprising:
a first robot arm comprising a first sleeve, a mounting member, a bearing rotatably mounted on the mounting member, a first input shaft and a second input shaft, the first input shaft being sleeved on the second input shaft, the second input shaft seated in the first sleeve, the first sleeve comprising a base portion and an assembly portion extending from one end of the base portion, the base portion axially defining a pivot hole, the assembly portion axially defining an assembly hole communicating with the pivot hole, a mounting surface formed at a connecting portion of the assembly hole and the pivot hole, the mounting member detachably mounted on the mounting surface and wholly received in the pivot hole and the assembly hole, the first input shaft rotatably connected to the base portion by the bearing and received in the pivot hole; and
a second robot arm rotatably connected to the first robot arm, the second robot arm comprising a second sleeve and an output shaft received in the second sleeve;
wherein the first input shaft is connected to the second sleeve via a pair of bevel gears, and drives the second sleeve to swing relative to the first sleeve; the second input shaft is connected to the output shaft via a plurality of bevel gears meshing with each other, and drives the output shaft to rotate relative to the second sleeve.

2. The robot arm assembly of claim 1, wherein the second sleeve comprising a main body, a first connecting arm and a second connecting arm extending from opposite sides of the main body, the first connecting arm and the second connecting arm rotatably connected to the assembly portion respectively.

3. The robot arm assembly of claim 2, wherein one of the pair of bevel gears connecting the first input shaft to the second sleeve is fixed to an end of the first input shaft, and the other one of the pair of bevel gears connecting the first input shaft to the second sleeve is connected to the first connecting arm via a fixing base.

4. The robot arm assembly of claim 3, wherein the first sleeve further comprises a connecting portion extending from the other end of the base portion opposite to the assembly portion, the bevel gear connected to the fixing base is rotatably seated in the connecting portion via a cross roller bearing.

5. The robot arm assembly of claim 1, wherein the second sleeve forms a receiving portion adjacent to the second connecting arm for receiving the plurality of bevel gears.

6. The robot arm assembly of claim 5, wherein the main body forms an output portion, the second robot arm comprising an output flange, and the output flange is connected to the output shaft.

7. The robot arm assembly of claim 1, wherein the first robot arm further comprises a connecting shaft, an end of the connecting shaft is connected to the bevel gears connecting with the first input shaft, and an other part of the connecting shaft is connected to the bevel gears connecting with the second input shaft.

8. A robot arm assembly, comprising:
a first robot arm comprising a first sleeve, a mounting member, a bearing rotatably mounted on the mounting member, a first input shaft and a second input shaft, the first input shaft being sleeved on the second input shaft, the second input shaft seated in the first sleeve, the first sleeve comprising a base portion and an assembly portion extending from one end of the base portion, the base portion axially defining a pivot hole, the assembly portion axially defining an assembly hole communicating with the pivot hole, a mounting surface formed at a connecting portion of the assembly hole and the pivot hole, the mounting member detachably mounted on the mounting surface and wholly received in the pivot hole and the assembly hole, the first input shaft rotatably connected to the base portion by the bearing and received in the pivot hole; and
a second robot arm comprising a second sleeve and an output shaft received in the second sleeve, the second sleeve comprising a main body, a first connecting arm and a second connecting arm extending from opposite sides of the main body, the first connecting arm and the second connecting arm rotatably connected to the first robot arm respectively;
wherein the first input shaft is connected to the second sleeve via a pair of bevel gears positioned at a first side of the robot arm assembly, and the first input shaft drives the second sleeve to swing relative to the first sleeve; the second input shaft is connected to the output shaft via a plurality of bevel gears meshing with each other and positioned at the first side of the robot arm assembly, and the second input shaft drives the output shaft to rotate relative to the second sleeve.

9. The robot arm assembly of claim 8, wherein one of the pair of bevel gears connecting the first input shaft to the second sleeve is fixed to an end of the first input shaft, and the other one of the pair of bevel gears connecting the first input shaft to the second sleeve is connected to the first connecting arm via a fixing base.

10. The robot arm assembly of claim 9, wherein the first sleeve further comprises a connecting portion extending from the other end of the base portion opposite to the assembly portion, the bevel gear connected to the fixing base is rotatably seated in the connecting portion via a cross roller bearing.

11. The robot arm assembly of claim 8, wherein the second sleeve forms a receiving portion adjacent to the second connecting arm for receiving the plurality of bevel gears.

12. The robot arm assembly of claim 11, wherein the main body forms an output portion, the second robot arm comprising an output flange, and the output flange is connected to the output shaft.

13. The robot arm assembly of claim 8, wherein the first robot arm further comprises a connecting shaft, an end of the connecting shaft is connected to the bevel gears connecting with the first input shaft, and an other part of the connecting shaft is connected to the bevel gears connecting with the second input shaft.

* * * * *